US012768525B2

(12) United States Patent
Ernst et al.

(10) Patent No.: US 12,768,525 B2
(45) Date of Patent: Oct. 20, 2026

(54) LAMP, SMART LAMP, AND LIGHTING EQUIPMENT

(71) Applicant: Astera Manufacturing Limited, Shenzhen (CN)

(72) Inventors: Norbert Ernst, Shenzhen (CN); Simon Canins, Munich (DE)

(73) Assignee: Astera Manufacturing Limited, Shenzhen (CN)

( * ) Notice: Subject to any disclaimer, the term of this patent is extended or adjusted under 35 U.S.C. 154(b) by 0 days.

(21) Appl. No.: 19/325,761

(22) Filed: Sep. 11, 2025

(65) Prior Publication Data

US 2026/0085824 A1 Mar. 26, 2026

(30) Foreign Application Priority Data

Sep. 26, 2024 (CN) ......................... 202422368393.3

(51) Int. Cl.
*F21V 21/30* (2006.01)
*F21V 14/06* (2006.01)
*F21V 23/04* (2006.01)

(52) U.S. Cl.
CPC .............. *F21V 21/30* (2013.01); *F21V 14/06* (2013.01); *F21V 23/0435* (2013.01)

(58) Field of Classification Search
CPC ....... F21V 21/30; F21V 14/06; F21V 23/0435
See application file for complete search history.

(56) References Cited

U.S. PATENT DOCUMENTS 8,840,273 B2 * 9/2014 Sooferian ............... F21V 13/04 362/280
9,140,431 B1 * 9/2015 Lee ....................... F21V 13/045
12,085,261 B2 * 9/2024 Gao ........................ F21V 19/02
(Continued)

FOREIGN PATENT DOCUMENTS

CN 210164770 U 3/2020
CN 210165318 U 3/2020
(Continued)

OTHER PUBLICATIONS

European Patent Office, Partial European Search Report for EP Application EP25203746, Dated: Feb. 16, 2026.
(Continued)

*Primary Examiner* — Bryon T Gyllstrom
(74) *Attorney, Agent, or Firm* — Luedeka Neely, P.C.; Mark P. Crockett

(57) ABSTRACT

A lamp includes a lamp body, a light source, a lens, a movable base, and an adjustment ring. The light source is fixed in the lamp body. The movable base is movably connected to the lamp body and movable along an axial direction of the lens. The lamp body hinders a rotation of the movable base relative to the lamp body. The lens is fixed to the movable base. The adjustment ring is rotatable about the movable base and movable along the axial direction of the lens in synchronization with the movable base. At least one of the adjustment ring and the lamp body includes a sliding block, and the other includes a first sliding groove. When the adjustment ring is rotated relative to the movable base, the adjustment ring moves in synchronization with the movable base to change a distance between the lens and the light source.

11 Claims, 6 Drawing Sheets

(56) References Cited

U.S. PATENT DOCUMENTS

| | | | | |
|---|---|---|---|---|
| 2017/0307196 | A1* | 10/2017 | Matsui | F21V 14/00 |
| 2020/0063951 | A1* | 2/2020 | Yu | H05B 45/10 |
| 2022/0146080 | A1* | 5/2022 | Gu | F21V 14/06 |

FOREIGN PATENT DOCUMENTS

| | | | |
|---|---|---|---|
| CN | 218510708 | U | 2/2023 |
| KR | 20100124063 | A | 11/2010 |

OTHER PUBLICATIONS

European Patent Office, Partial European Search Report for EP Application EP25203746, Provisional Opinion accompanying the partial search results, Dated: Feb. 16, 2026.

* cited by examiner

LAMP, SMART LAMP, AND LIGHTING EQUIPMENT

CROSS-REFERENCE TO RELATED APPLICATION

This application is based on and claims the benefit of priority from Chinese Patent Application No. 202422368393.3, filed on 26 Sep. 2024, the entirety of which is incorporated by reference herein.

TECHNICAL FIELD

The present disclosure relates to the technical field of lighting, and in particular, to a lamp, a smart lamp, and a lighting equipment.

BACKGROUND

The beam angle refers to an angle at which a beam is emitted from a light source or lamp, i.e., an angle formed by the beam at the boundary of a certain intensity range. The beam angle affects the lighting effect, and different beam angles are suitable for different scenarios. Narrow beam angles are suitable for scenarios that require concentrated lighting, such as stage lighting or scenarios where specific objects need to be highlighted through light. Medium beam angles are suitable for scenarios that require a range of lighting, such as home lighting or lighting in commercial spaces. Wide beam angles are suitable for scenarios that require extensive lighting, such as offices or large shopping malls.

Lamps with adjustable beam angles exist in the existing technology. The basic principle of such lamps is to change the distance between the lens and the light source, thereby changing the beam angle. Particularly, the lens is mounted on a base, such that the lens can be moved by rotating the base. However, as the base rotates, a light shield or other accessories mounted at a front end of the base rotate synchronously, and may collide with an object nearby, resulting in the falling or damage of the light shield or other accessories.

SUMMARY

The present disclosure aims to resolve at least one of the technical problems in the related art. Therefore, the present disclosure provides a lamp, which can prevent the accessories mounted at the front end of the base from rotating along with the base mounted with the lens, thereby reducing the risk of damage and falling of the light shield or other accessories.

The present disclosure further provides a smart lamp and a lighting equipment.

In accordance with a first aspect of the present disclosure, an embodiment provides a lamp, including: a lamp body; a light source fixed in the lamp body; a lens, where a light output surface of the light source faces the lens; a movable base movably connected to the lamp body, where the movable base is movable relative to the lamp body along an axial direction of the lens, the lamp body is configured to hinder a rotation of the movable base relative to the lamp body, and the lens is fixed to the movable base; and an adjustment ring sleeved over the movable base, where the adjustment ring is rotatable about a central axis of the lens relative to the movable base and is movable along the axial direction of the lens in synchronization with the movable base; where at least one of the adjustment ring and the lamp body includes a sliding block, another of the adjustment ring and the lamp body includes a first sliding groove, two ends of the first sliding groove are spaced apart in a radial direction of the lens and are spaced apart in a circumferential direction of the lens, and the sliding block is slidably arranged in the first sliding groove; and when the adjustment ring is rotated relative to the movable base, the sliding block slides along the first sliding groove, and the adjustment ring moves in synchronization with the movable base to change a distance between the lens and the light source.

The lamp of the embodiment of the first aspect of the present disclosure has the following beneficial effects. According to the lamp of the present disclosure, when the adjustment ring is rotated during the adjustment of the beam angle, the movable base mounted with the lens does not rotate, and only moves linearly. As such, even if a light shield or other types of accessories are mounted on the movable base, the accessories will not rotate during the adjustment of the beam angle, such that the risk of damage and falling of the accessories is reduced.

According to some embodiments of the present disclosure, the adjustment ring includes the first sliding groove, the lamp body includes the sliding block, the movable base includes a second sliding groove, the second sliding groove is straight and extends in an axial direction of the lens, and the sliding block is slidably arranged in the second sliding groove.

According to some embodiments of the present disclosure, the movable base includes a first shell and a second shell which are fixedly connected, the second shell includes a body portion and a limiting portion, the body portion is annular, the body portion is provided with the second sliding groove, the adjustment ring is rotatably sleeved over the body portion, and the limiting portion is connected to one end of the body portion and protrudes relative to an outer peripheral surface of the body portion; and a part of the first shell protrudes relative to the outer peripheral surface of the body portion, and the first shell and the limiting portion clamp the adjustment ring in the axial direction of the lens.

According to some embodiments of the present disclosure, one of the movable base and the lamp body includes a first engagement portion, another of the movable base and the lamp body includes an engagement groove, and the first engagement portion is engaged in the engagement groove in response to the distance between the lens and the light source reaching a maximum value.

According to some embodiments of the present disclosure, the lamp further includes a light guide column fixed in the lamp body and located between the light output surface and the lens.

According to some embodiments of the present disclosure, the lamp further includes: a light shield detachably connected to the movable base and surrounding the lens; a lock mounted on the lamp body; and a safety rope, where one end of the safety rope is connected to the light shield, and another end of the safety rope is connected to the lock.

According to some embodiments of the present disclosure, the safety rope includes a rope and a locking pin, the locking pin is connected to one end of the rope away from the light shield, the locking pin includes an insertion portion and a projecting portion, two ends of the insertion portion are respectively connected to the projecting portion and the safety rope, and the projecting portion projects relative to an outer peripheral surface of the insertion portion; and the lock includes: a strike plate mounted on an outer surface of the lamp body, where the strike plate is provided with a first through hole and a second through hole, and the locking pin is passed through the first through hole; a lock bolt including a second engagement portion and an unlocking portion, where a part of the unlocking portion extends out of the strike plate through the second through hole; and an elastic member, where one end of the elastic member is connected to the lock bolt, another end of the elastic member is connected to the lamp body, and an elastic force of the elastic member is used to maintain an engagement between the second engagement portion and the projecting portion.

In accordance with a second aspect of the present disclosure, an embodiment provides a smart lamp, including: a lamp body provided with an accommodating space; a light source arranged in the accommodating space; a plurality of batteries arranged in the accommodating space and arranged around a periphery of the light source; a movable base movably connected to the lamp body, where the movable base is movable in a front-rear direction relative to the lamp body along an optical axis; a lens fixed to a front end of the movable base, where the lens is movable in synchronization with the movable base to change a distance between the lens and the light source; and a control module including a control board arranged at a rear end of the lamp body, where the control board is provided with an intelligent user interface, the intelligent user interface includes at least one button, where each of the at least one button is configured to control the smart lamp to execute a function corresponding to the button.

In accordance with a third aspect of the present disclosure, an embodiment provides a lighting equipment, including: a plurality of lamps, each including a lamp body, a light source, a lens, and a movable base, where the lamp body is provided with an accommodating space, the light source is arranged in the accommodating space, the movable base is movably connected to the lamp body and is movable along an optical axis relative to the lamp body, the lens is fixed to the movable base and is movable in synchronization with the movable base to change a distance between the lens and the light source, and the lamp body is configured to hinder a rotation of the movable base relative to the lamp body; a box including a plurality of recesses, where each of the recesses is configured to receive a respective one of the lamps; and a box power module mounted on the box and electrically connected to the lamps in the respective recesses.

The lighting equipment of the embodiment of the third aspect of the present disclosure has the following beneficial effects. The lighting equipment may integrate a plurality of lamps, to achieve a high lighting brightness. In addition, because the beam angle of the lamp can be adjusted, the light output effect of the lighting equipment can be flexibly adjusted. Moreover, the lamps can be detached from the recesses, so that a user can adjust the number of lamps mounted in the box according to a required brightness of lighting or other requirements.

According to some embodiments of the present disclosure, the lighting equipment further includes infrared emitters, one or more of the infrared emitters are arranged in each of the recesses, each of the lamps further includes an infrared receiver, the infrared receiver is exposed out of the lamp body, and the infrared receiver is capable of receiving a signal from the respective infrared emitter when the respective lamp is arranged in the respective recess; and the box includes a first wireless communication module, each of the lamps further includes a control assembly, the control assembly is configured to control an operational status of the respective lamp, the control assembly includes a second wireless communication module, and the first wireless communication module is communicatively connected to the second wireless communication module.

According to some embodiments of the present disclosure, the first wireless communication module includes at least one of a Bluetooth module, a digital multiplexer (DMX) module, a cognitive radio multiplexer (CRMX) module, an ultra-high frequency electromagnetic wave (UHF) module, or a 2.4 G Wi-Fi module; and the second wireless communication module includes at least one of a Bluetooth module, a DMX module, a CRMX module, a UHF module, or a 2.4G Wi-Fi module.

Additional aspects and advantages of the present disclosure will be partly given in and partly apparent from the description below, or understood through practice of the present disclosure.

BRIEF DESCRIPTION OF DRAWINGS

The present disclosure is further described below with reference to the accompanying drawings and embodiments. In the drawings.

Figure 1:
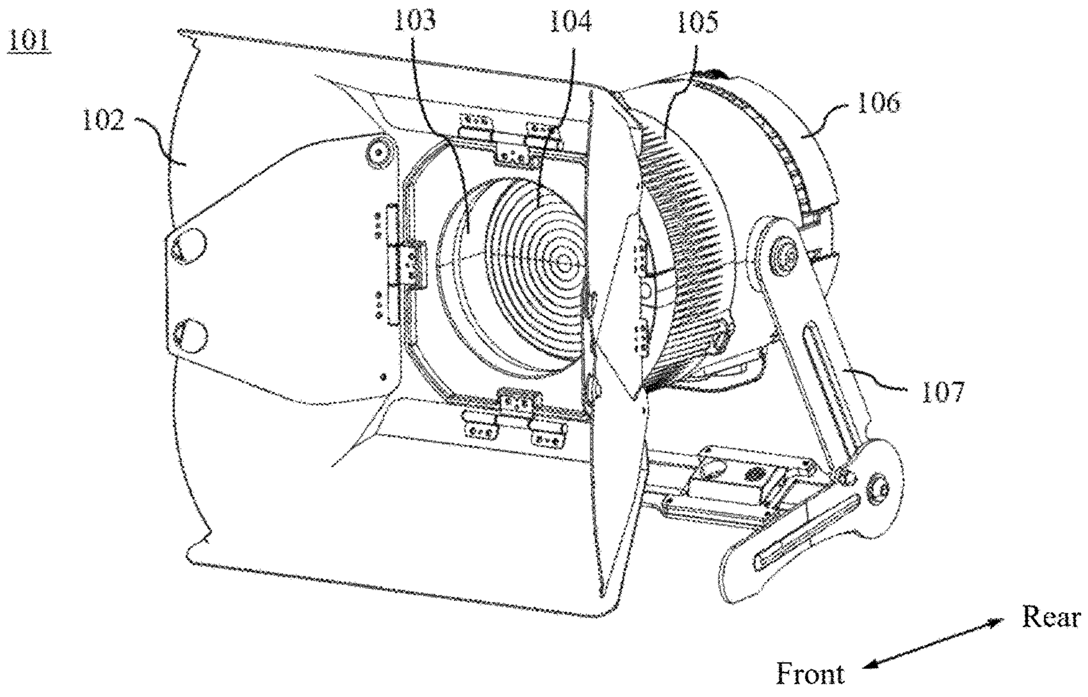
FIG. 1 is a schematic view of a lamp according to an embodiment of the present disclosure.

Reference numerals: 101—lamp, 102—light shield, 103—movable base, 104—lens, 105—adjustment ring, 106—lamp body, 107—bracket, 108—first electrical connector, 109—lock, 110—safety rope, 111—first shell, 112—second shell, 113—sliding block, 114—front housing, 115—glass sheet, 116—light blocking sleeve, 117—light guide column, 118—middle housing, 119—rear housing, 120—first sliding groove, 121—anti-skid texture, 122—second sliding groove, 123—body portion, 124—limiting portion, 126—first engagement portion, 127—engagement groove, 128—lamp power module, 129—light source, 130—optical axis, 131—elastic member, 132—strike plate, 133—second through hole, 134—unlocking portion, 135—inclined surface, 136—first through hole, 137—second engagement portion, 138—locking pin, 139—projecting portion, 140—insertion portion, 141—lock bolt, 142—rope, 144—intelligent user interface, 145—button, 146—accommodating space, 300—lighting equipment, 301—box, 302—indicator light, 303—recess, 304—central region, 305—peripheral region, 306—control assembly.

DETAILED DESCRIPTION

Embodiments of the present disclosure will be described in detail below with reference to the accompanying drawings, in which the same or like reference characters refer to the same or like elements or elements having the same or like functions throughout. The embodiments described below by reference to the accompanying drawings are exemplary and are intended for explanation only and are not to be construed as limiting the present disclosure.

In the description of the present disclosure, it should be understood that for the description of orientations, the orientation or positional relationships indicated by the terms such as "on," "below," "front," "rear," "left," and "right" are based on orientation or position relationships shown in the accompanying drawings, and are used only for ease and brevity of illustration and description, rather than indicating or implying that the mentioned apparatus or element must have a particular orientation or must be constructed and operated in a particular orientation. Therefore, such terms should not be construed as limiting of the present disclosure.

In the description of the present disclosure, the term "at least one" means one or more, the term "plurality of" (or multiple) means at least two, the term such as "greater than," "less than," "exceed" or variants thereof prior to a number or series of numbers is understood to not including the number adjacent to the term. The term "at least" prior to a number or series of numbers is understood to include the number adjacent to the term "at least," and all subsequent numbers or integers that could logically be included, as clear from context. If used herein, the terms such as "first," "second," and the like are merely used for distinguishing technical features, and are not intended to indicate or imply relative importance, or implicitly point out the number of the indicated technical features, or implicitly point out the order of the indicated technical features.

In the description of the present disclosure, unless otherwise explicitly defined, the terms such as "configure," "mount/mount" and "connect" should be understood in a broad sense, and those having ordinary skill in the art can reasonably determine the specific meanings of the above terms in the present disclosure based on the specific contents of the technical scheme.

Figure 2:
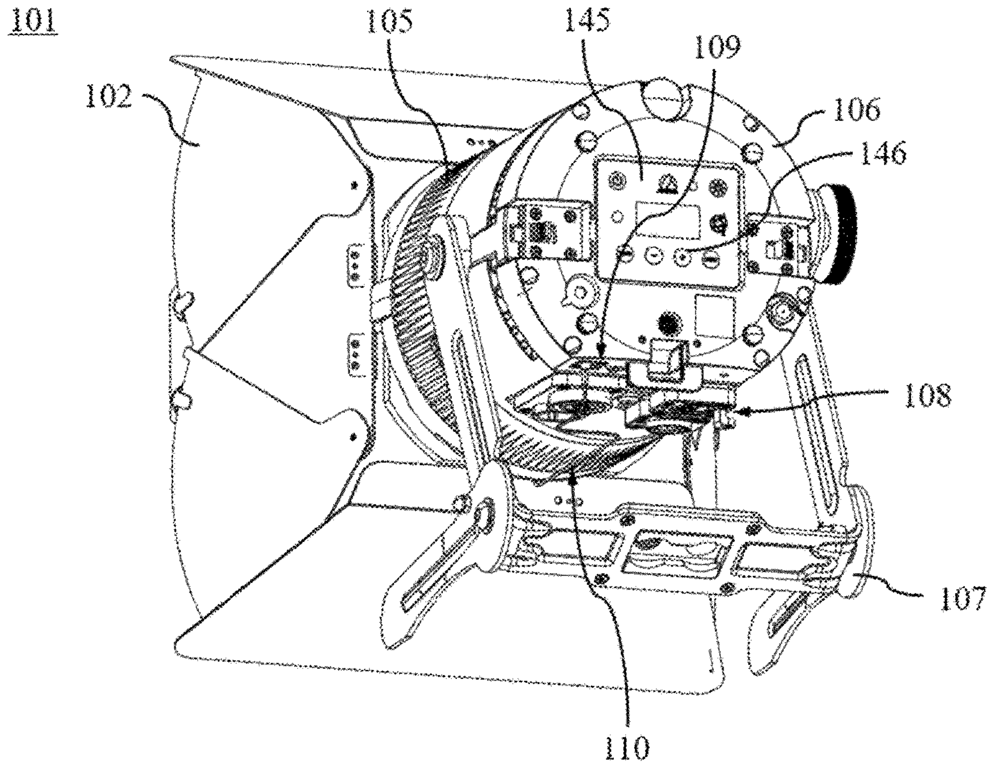
FIG. 2 is a schematic view of the lamp shown in FIG. 1 from another viewing angle.
Figure 3:
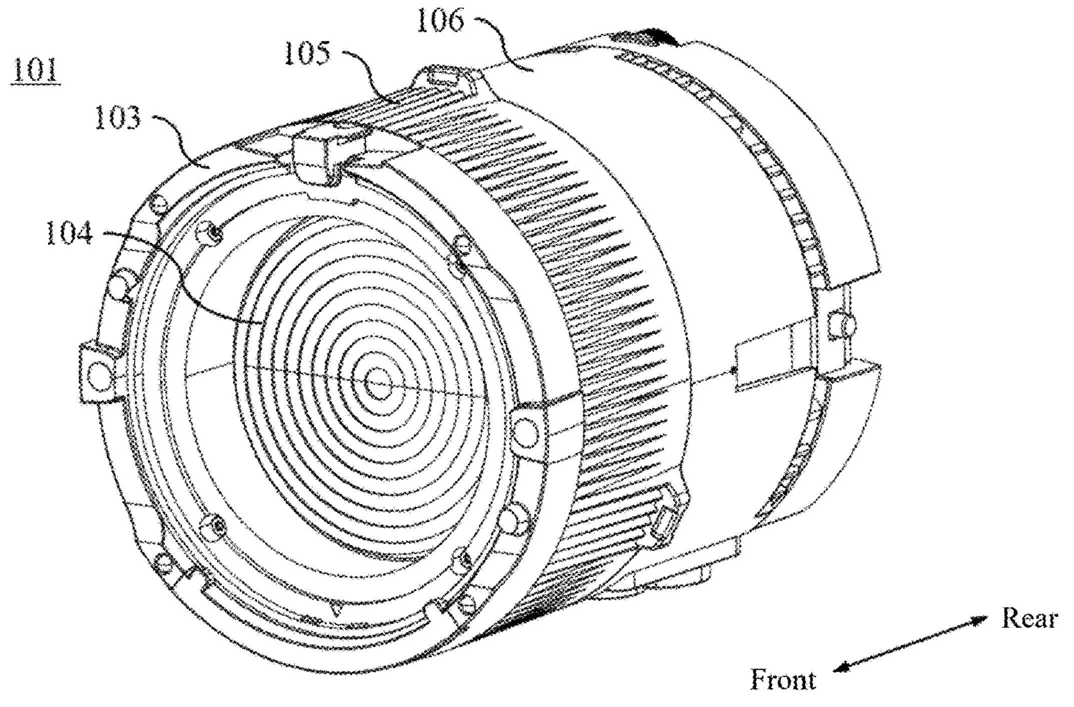
FIG. 3 is a schematic view of the lamp shown in FIG. 1 in a state in which a bracket and a light shield have been removed.

As shown in FIG. 3, in some embodiments, a lamp 101 includes a lamp body 106, a light source 129, a lens 104, a movable base 103, and an adjustment ring 105. As shown in FIG. 1 and FIG. 2, in some embodiments, the lamp 101 may further include a light shield 102 and a bracket 107, the light shield 102 is detachably connected to the movable base 103, and the light shield 102 surrounds the lens 104. The bracket 107 is connected to the lamp body 106. An angle of the lamp body 106 relative to the bracket 107 is adjustable, such that the illumination angle of the lamp 101 is adjustable.

Figure 5:
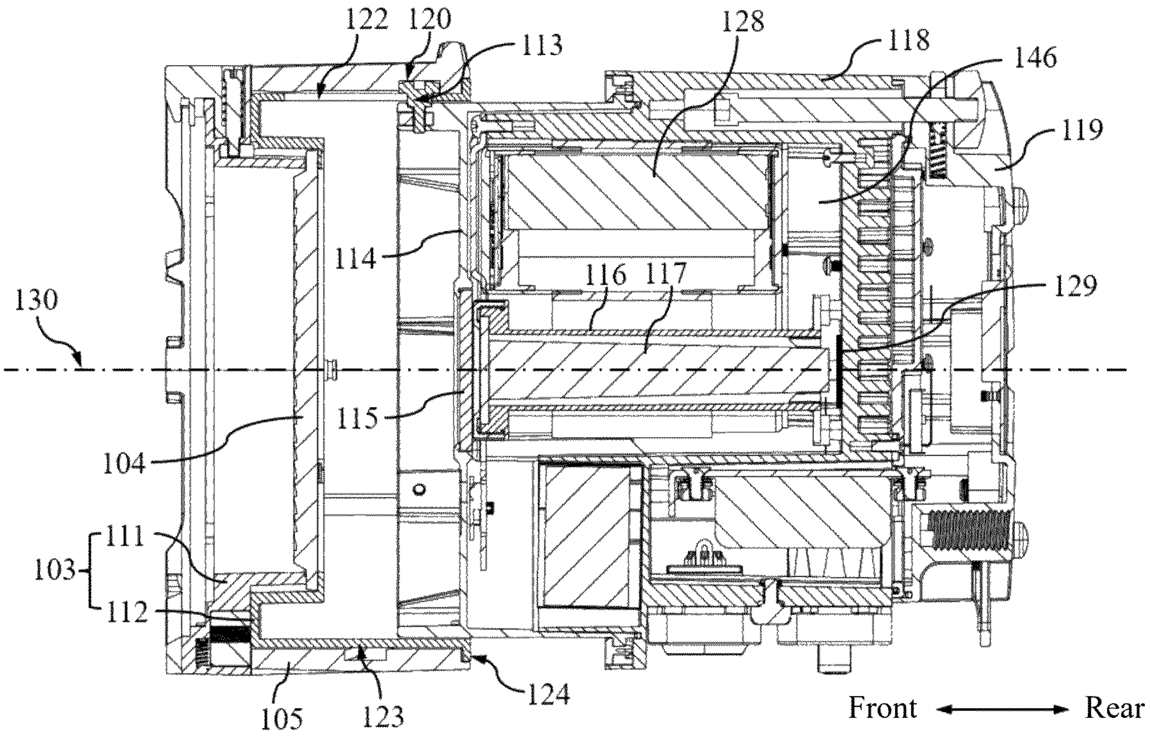
FIG. 5 is a sectional view of a lamp at a minimum beam angle.
Figure 6:
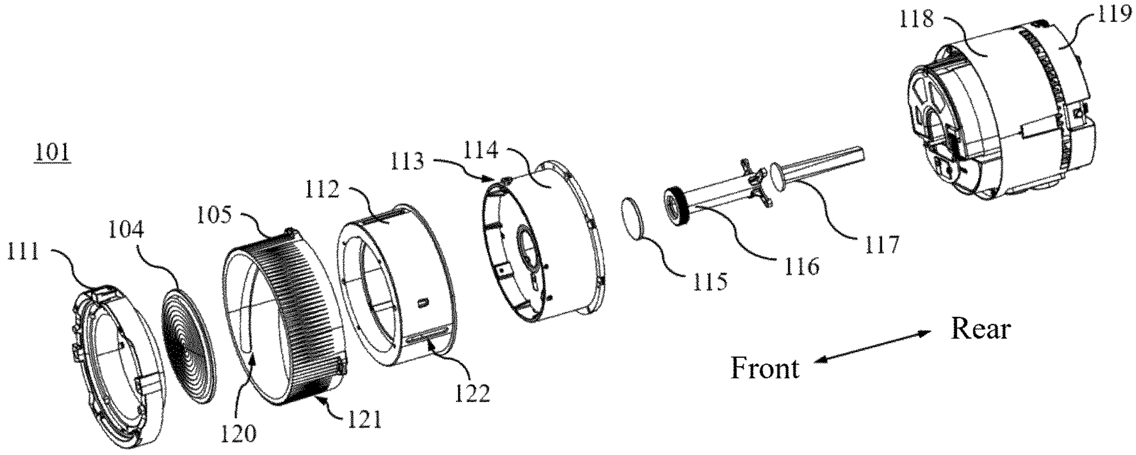
FIG. 6 is an exploded view of the lamp shown in FIG. 3.

The lamp body 106 is provided with an accommodating space 146, and the light source 129 is arranged in the accommodating space 146. Referring to FIG. 3 and FIG. 6, in an embodiment, the lamp body 106 includes a front housing 114, a middle housing 118, and a rear housing 119, and the front housing 114 and the rear housing 119 are respectively connected to a front end and a rear end of the middle housing 118. As shown in FIG. 5, the front housing 114, the middle housing 118, and the rear housing 119 are connected to form a cavity, which is the accommodating space 146. The light source 129 may be fixed to the rear end of the middle housing 118, and thus fixed in the accommodating space 146.

Figure 4:
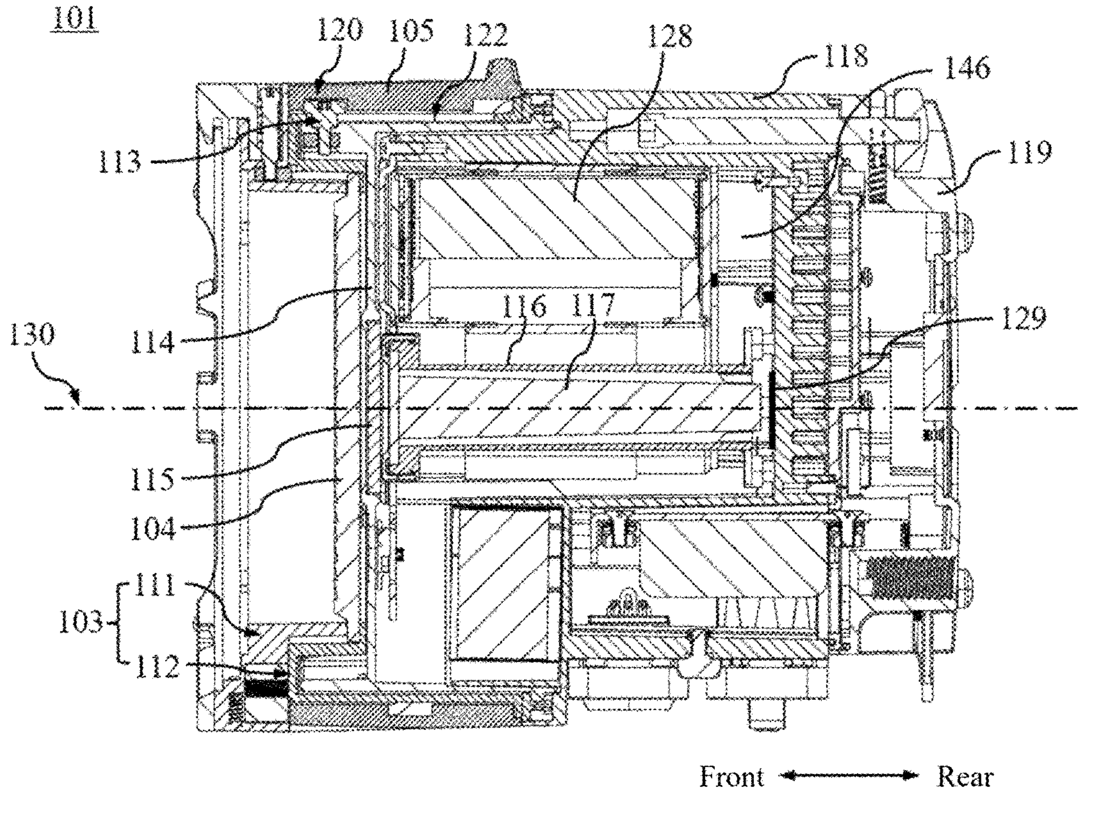
FIG. 4 is a sectional view of a lamp at a maximum beam angle.

Referring to FIG. 4 and FIG. 5, the lens 104 is fixedly connected to the movable base 103, and the movable base 103 is movably connected to the lamp body 106. The movable base 103 is movable along an optical axis 130 of the lens 104 relative to the lamp body 106. When the movable base 103 moves, the lens 104 moves in synchronization with the movable base 103. "Moving along the optical axis 130 of the lens 104" means moving along an extending direction of the optical axis 130 (corresponding to a front-rear direction in the drawings), i.e., moving along an axial direction of the lens 104. The lamp body 106 is configured to hinder a rotation of the movable base 103 relative to the lamp body 106. In other words, the movable base 103 is only able to move linearly relative to the lamp body 106. A light output surface of the light source 129 faces the lens 104. Light can be emitted from the light output surface. The light source 129 may be a light-emitting diode (LED) chip. As shown in FIG. 4 and FIG. 5, in this embodiment, the light output surface of the light source 129 is a front surface of the light source 129, and the lens 104 is located on a front side of the light source 129. Light emitted from the light output surface can pass through the lens 104 and be emitted outward. The lens 104 may be a Fresnel lens 104 or another type of lens 104. When the lens 104 is a Fresnel lens 104, the lens 104 includes a helical surface provided with a plurality of concentric annular protrusions and facing away from the light source 129.

As shown in FIG. 4 and FIG. 5, the adjustment ring 105 is sleeved over the movable base 103. The adjustment ring 105 is rotatable about the optical axis 130 of the lens 104 relative to the movable base 103 and is movable along the optical axis 130 of the lens 104 in synchronization with the movable base 103. As shown in FIG. 6, the adjustment ring 105 includes a first sliding groove 120, and the lamp body 106 includes a sliding block 113. Two ends of the first sliding groove 120 are spaced apart in a radial direction of the lens 104 and are spaced apart in a circumferential direction of the lens 104. In other words, the first sliding groove 120 is inclined with respect to the optical axis 130 of the lens 104. As shown in FIG. 4 or FIG. 5, the sliding block 113 is slidably arranged in the first sliding groove 120. In some other embodiments not shown, the positions of the first sliding groove 120 and the sliding block 113 are interchangeable. For example, the adjustment ring 105 includes the sliding block 113, and the lamp body 106 includes the first sliding groove 120.

Because the first sliding groove 120 is inclined, when the adjustment ring 105 is rotated relative to the movable base 103, the sliding block 113 slides along the first sliding groove 120, and the adjustment ring 105 moves in synchronization with the movable base 103, to change a distance between the lens 104 and the light source 129, thus changing a beam angle of the lamp 101. The distance between the lens 104 and the light source 129 is a distance between the lens 104 and the light source 129 in an axial direction of the lens 104.

Generally, a longer distance between the lens 104 and the light source 129 indicates a longer light path in the lamp 101 and a smaller beam angle. Taking FIG. 4 to FIG. 6 as an example, when the adjustment ring 105 is rotated clockwise relative to the movable base 103 (viewed from front to rear), the adjustment ring 105 and the movable base 103 also move forward, the distance between the lens 104 and the light source 129 increases, and the beam angle decreases. On the contrary, when the adjustment ring 105 is rotated counterclockwise relative to the movable base 103 (viewed from front to rear), the adjustment ring 105 and the movable base 103 also move backward, the distance between the lens 104 and the light source 129 decreases, and the beam angle increases. In some embodiments, an adjustment range of the beam angle may be set to 15° to 50°. A user can quickly and conveniently adjust the beam angle by rotating the adjustment ring 105.

According to the lamp 101 of the present disclosure, when the adjustment ring 105 is rotated during the adjustment of the beam angle, the movable base 103 mounted with the lens 104 does not rotate, and only moves linearly. In this way, the light shield 102 or other types of accessories mounted on the movable base 103 do not rotate during the adjustment of the beam angle, such that the risk of damage and falling of the accessories mounted on the movable base 103 is reduced.

Fitting relationship between the adjustment ring 105, the movable base 103, and the lamp body 106 will be further described below.

The adjustment ring 105 includes the first sliding groove 120, the front housing 114 of the lamp body 106 includes the sliding block 113, and the movable base 103 includes a second sliding groove 122 (the second sliding groove 122 may be located on a second shell 112 of the movable base 103). As shown in FIG. 6, the second sliding groove 122 is straight and extends along the axial direction of the lens 104. As shown in FIG. 4 or FIG. 5, the sliding block 113 is slidably arranged in the first sliding groove 120, and is also slidably arranged in the second sliding groove 122. A wall of the second sliding groove 122 can hinder a rotation of the sliding block 113 relative to the movable base 103, to prevent the movable base 103 from rotating about the optical axis 130 of the lens 104, and ensure that the movable base 103 is movable only along the axial direction of the lens 104.

Figure 7:
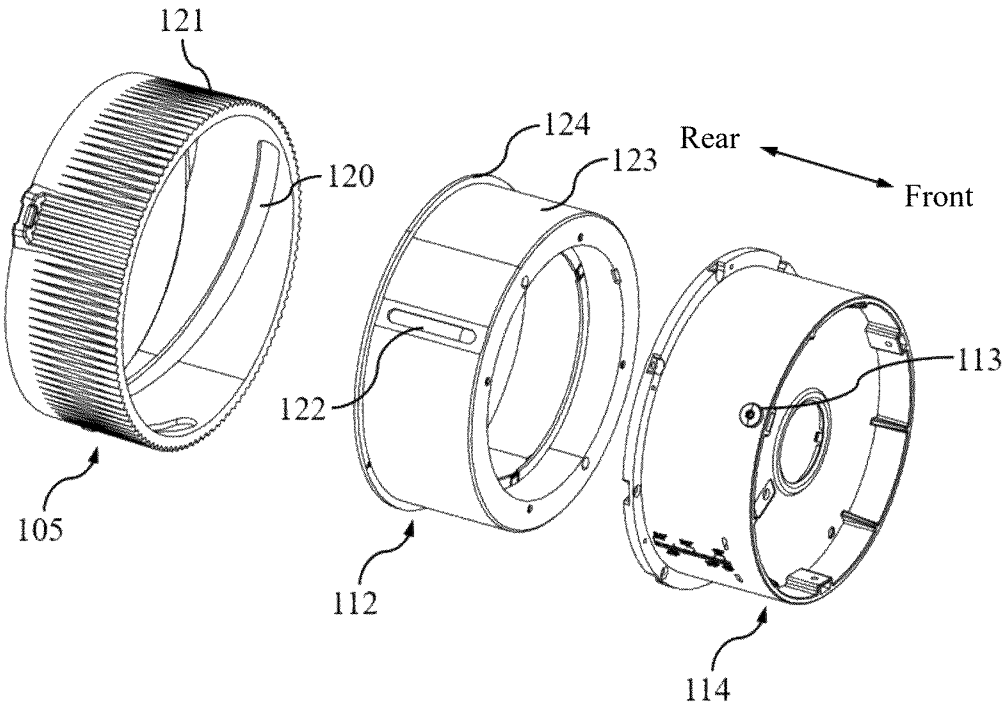
FIG. 7 is a schematic view of a front housing, a second shell, and a movable ring.

As shown in FIG. 5, in some embodiments, the movable base 103 includes a first shell 111 and a second shell 112 which are fixedly connected. The first shell 111 may be fixed to the second shell 112 by threaded connection, snap-fit, etc. As shown in FIG. 7, the second shell 112 includes a body portion 123 and a limiting portion 124, the body portion 123 is annular, the limiting portion 124 is connected to one end of the body portion 123, and the limiting portion 124 protrudes relative to an outer peripheral surface of the body portion 123. As shown in FIG. 5, the second sliding groove 122 is arranged on the body portion 123, and the adjustment ring 105 is rotatably sleeved over the body portion 123. A part of the first shell 111 protrudes relative to the outer peripheral surface of the body portion 123, and the first shell 111 and the limiting portion 124 clamp the adjustment ring 105 in the axial direction of the lens 104. As shown in FIG. 5, the first shell 111 presses against a front end of the adjustment ring 105, the limiting portion 124 presses against a rear end of the adjustment ring 105, and the adjustment ring 105 is clamped by the first shell 111 and the limiting portion 124 in the front-rear direction. As such, the first shell 111 and the limiting portion 124 jointly limit the movement of the adjustment ring 105, to prevent the adjustment ring 105 from moving relative to the movable base 103, and ensure that the adjustment ring 105 and the movable base 103 can move synchronously along the axial direction of the lens 104.

As shown in FIG. 6 and FIG. 7, an anti-skid texture 121 may further be provided on the outer peripheral surface of the adjustment ring 105, and the anti-skid texture 121 is conducive to reducing the risk of a user's hand skidding on the adjustment ring 105, making it convenient for the user to rotate the adjustment ring 105. To improve the stability of the adjustment ring 105 and the movable base 103 during movement, a plurality of sliding blocks 113, a plurality of first sliding groove 120, and the second sliding groove 122 may be provided, and the plurality of sliding blocks 113 are distributed at intervals along the circumferential direction of the lens 104.

Figure 8:
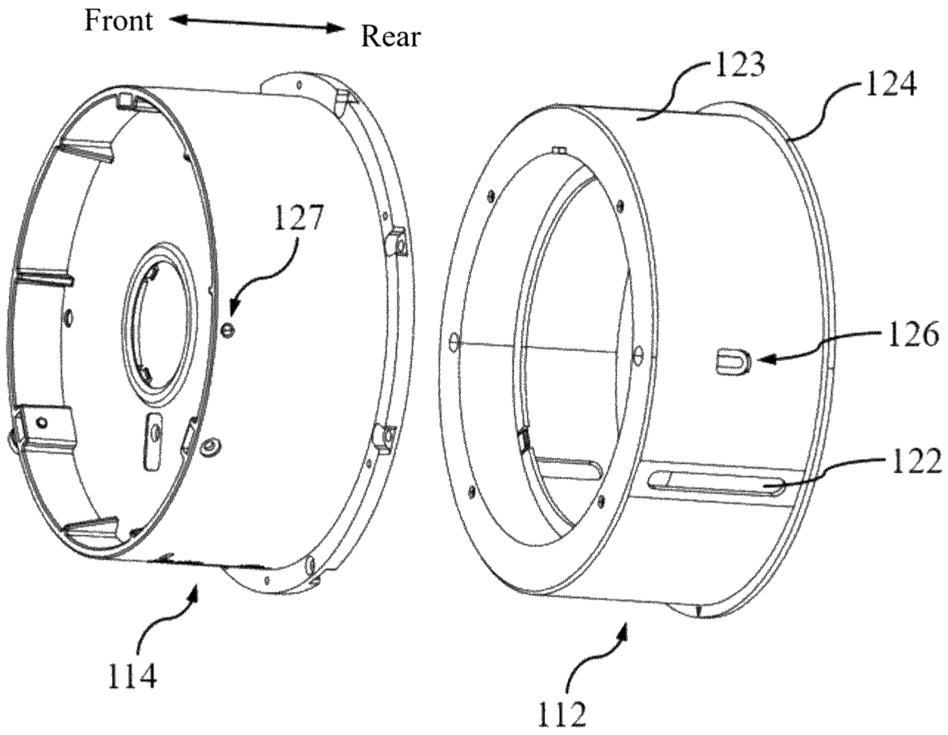
FIG. 8 is a schematic view of the front housing and the second shell from another viewing angle.
Figure 9:
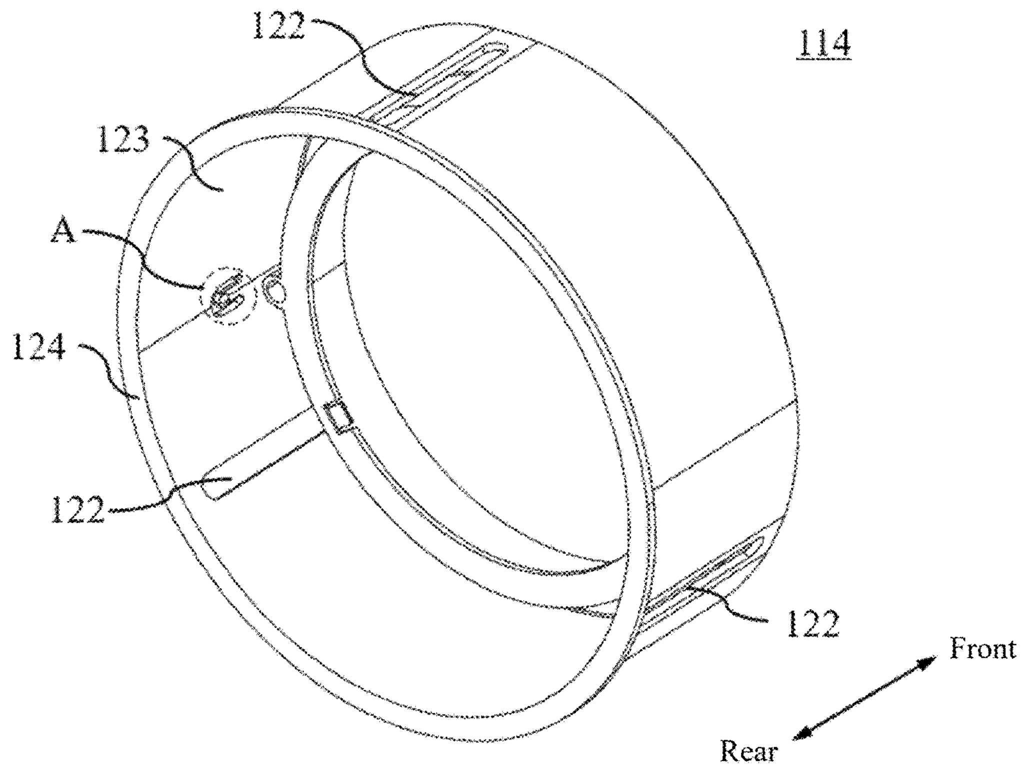
FIG. 9 is a schematic view of an inner side of the second shell.
Figure 10:
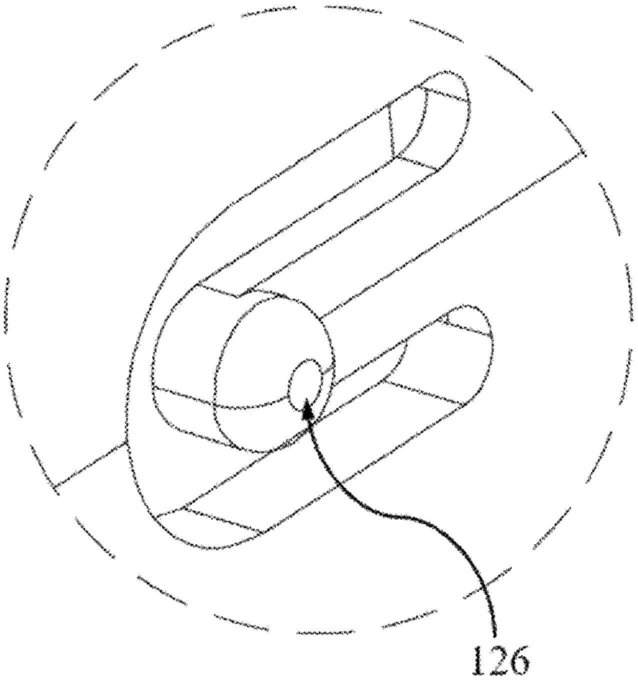
FIG. 10 is an enlarged view of part A in FIG. 9.

In some embodiments, the movable base 103 further includes a first engagement portion 126, and the lamp body 106 includes an engagement groove 127. As shown in FIG. 8, the second shell 112 of the movable base 103 includes the first engagement portion 126, and the engagement groove 127 is provided on an outer peripheral surface of the front housing 114 of the lamp body 106. As shown in FIG. 9 and FIG. 10, the first engagement portion 126 is configured as a cantilever-type buckle, and the first engagement portion 126 is elastic so as to enter and exit the engagement groove 127. When the distance between the lens 104 and the light source 129 reaches a maximum value, i.e., when the beam angle reaches a minimum value (i.e., the state shown in FIG. 5), the first engagement portion 126 is engaged in the engagement groove 127.

When the first engagement portion 126 enters and exits the engagement groove 127, a sound is produced, providing a tactile feedback. Therefore, the first engagement portion 126 and the engagement groove 127 allow a user to conveniently determine whether the beam angle reaches the minimum value. In a process of a user driving the movable base 103 and the lens 104 to gradually move away from the light source 129 (i.e., a process of a user reducing the beam angle), the user can determine that the beam angle reaches the minimum value when the user hears the sound indicating that the first engagement portion 126 enters the engagement groove 127. Accordingly, the user does not further twist the adjustment ring 105 so as not to damage the lamp 101.

In a process of a user driving the movable base 103 and the lens 104 to gradually move toward the light source 129 (i.e., a process of a user increasing the beam angle), as the movable base 103 and the adjustment ring 105 gradually move backward, the movable base 103 will press against the front housing 114 of the lamp body 106 when the distance between the lens 104 and the light source 129 reaches the minimum value (i.e., when the beam angle reaches the maximum value). The user may determine whether the beam angle reaches the maximum value by determining whether the movable base 103 presses against the lamp body 106.

It should be noted that the maximum value and the minimum value of the beam angle mentioned above are maximum and minimum values of a beam angle adjustment range that the lamp 101 can provide. In some other embodiments not shown, the positions of the first engagement portion 126 and the engagement groove 127 are interchangeable. For example, the lamp body 106 includes the first engagement portion 126, and the movable base 103 includes the engagement groove 127. In other words, the engagement groove 127 may be arranged on the second shell 112, and the first engagement portion 126 may be arranged on the front housing 114.

As shown in FIG. 5, in some embodiments, the lamp 101 further includes a light guide column 117. The light guide column 117 is made of a light transmissive material, which may be glass, transparent plastic, etc. The light guide column 117 is configured to transmit light from the light source 129 to another location with a low loss. The light is transmitted within the light guide column 117 mainly by total internal reflection. The material of the light guide column 117 may be acrylic resin, polycarbonate, epoxy resin, glass, etc. The material of the light guide column 117 may be a material having a high light transmittance. For example, the light transmittance of the material may be greater than 90%. The light guide column 117 is fixed in the lamp body 106. The light guide column 117 is located in the cavity defined by the front housing 114, the middle housing 118, and the rear housing 119. The light guide column 117 is located between the light output surface of the light source 129 and the lens 104. The light emitted from the light source 129 first passes through the light guide column 117 and then passes through the lens 104. The light guide column 117 is configured to guide the light to the lens 104, to ensure that sufficient light can pass through the lens 104 and be emitted out. As shown in FIG. 5, the lamp 101 further includes a light blocking sleeve 116. The light blocking sleeve 116 is made of an opaque material (e.g., black plastic, black rubber, etc.). The light blocking sleeve 116 is sleeved over the light guide column 117. A rear end of the light blocking sleeve 116 is connected to the middle housing 118 by a screw, such that the light guide column 117 is fixed to the lamp body 106. The light blocking sleeve 116 can reduce the loss of light, thereby increasing the illumination intensity of the light emitted from the lens 104.

As shown in FIG. 5, in some embodiments, the lamp 101 further includes a glass sheet 115, the glass sheet 115 is snap-fitted to the front housing 114, and the glass sheet 115 is located between the lens 104 and the light guide column 117. In some embodiments, the glass sheet 115 may be configured as an optical filter to filter out light of a specific wavelength. In some other embodiments, a specific pattern may be provided on the glass sheet 115, and the corresponding pattern may be shown after the light is emitted out through the lens 104.

In some embodiments, to reduce the risk of falling of the light shield 102, the lamp 101 may further include a lock 109 and a safety rope 110. As shown in FIG. 2, the lock 109 is mounted on the lamp body 106, one end of the safety rope 110 is connected to the light shield 102, and another end of the safety rope 110 is connected to the lock 109. Even if the light shield 102 is detached from the movable base 103, the light shield 102 is still connected to the lamp body 106 by the safety rope 110 and the lock 109, such that the light shield 102 does not easily fall directly to the ground, and the risk of safety accidents is reduced.

Figure 11:
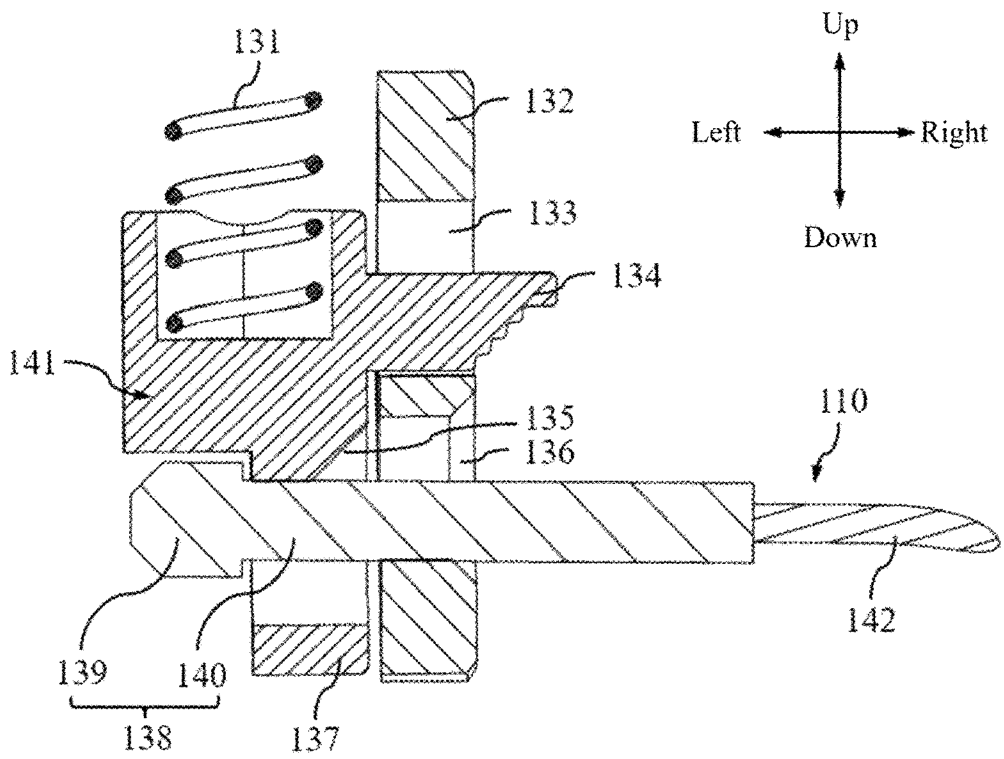
FIG. 11 is a schematic view showing a fitting relationship between a lock and a safety rope.

FIG. 11 shows a detailed structure of the lock 109, and also shows a state in which one end of the safety rope 110 is locked by the lock 109. As shown in FIG. 11, the safety rope 110 includes a rope 142 and a locking pin 138, the locking pin 138 is connected to an end of the rope 142 away from the light shield 102, and another end of the rope 142, which is not shown in FIG. 11, is configured to connect to the light shield 102. The locking pin 138 includes an insertion portion 140 and a projecting portion 139. Two ends of the insertion portion 140 are respectively connected to the projecting portion 139 and the safety rope 110. The projecting portion 139 projects relative to an outer peripheral surface of the insertion portion 140. The lock 109 includes a strike plate 132 and a lock bolt 141. The strike plate 132 is mounted on an outer surface of the lamp body 106. The strike plate 132 is provided with a first through hole 136 and a second through hole 133. The locking pin 138 is passed through the first through hole 136. The lock bolt 141 includes a second engagement portion 137 and an unlocking portion 134. A part of the unlocking portion 134 extends out of the strike plate 132 through the second through hole 133, such that a user can touch the unlocking portion 134. One end of the elastic member 131 is connected to the locking pin 138, and another end of the elastic member 131 is connected to the lamp body 106. For example, a bottom end of the elastic member 131 presses against the lock bolt 141, a top end of the elastic member 131 presses against the lamp body 106, and the elastic member 131 is in a compressed state. An elastic force of the elastic member 131 is used to maintain an engagement between the second engagement portion 137 and the projecting portion 139.

The working principle of the lock 109 will be briefly described below. As shown in FIG. 11, when the safety rope 110 is locked by the lock 109, the lock bolt 141 has a tendency to move downward due to the elastic force of the elastic member 131, such that the engagement between the projecting portion 139 of the locking pin 138 and the second engagement portion 137 is maintained. In this case, even if the light shield 102 falls off from the movable base 103 and pulls the rope 142 due to gravity, the locking pin 138 cannot move rightward to exit the first through hole 136, the lamp body 106 is still connected to the light shield 102 by the safety rope 110 and the lock 109, and the light shield 102 cannot freely fall to the ground.

To unlock the lock (e.g., when a user needs to replace or remove the light shield 102), the user may pull or push the unlocking portion 134 with a hand, to drive the lock bolt 141 to move upward against the elastic force of the elastic member 131 (i.e., to gradually compress the elastic member 131). After the second engagement portion 137 moves upward and detaches from the projecting portion 139, the user may pull the rope 142 to withdraw the locking pin 138 from the first through hole 136. As such, the connection between the safety rope 110 and the lock 109 can be released.

As shown in FIG. 11, an inclined surface 135 may be provided on a side of the second engagement portion 137 facing the first through hole 136, and an angle between a normal direction of the inclined surface 135 and an axial direction of the first through hole 136 is an acute angle. When the user needs to lock the safety rope 110 again by the lock 109, the user may insert the locking pin 138 into the first through hole 136 from right to left, and as the locking pin 138 gradually moves leftward, the projecting portion 139 presses against the inclined surface 135 and pushes the lock bolt 141 upward. The lock bolt 141 moves upward because a force applied by the projecting portion 139 to the inclined surface 135 can be decomposed into a force component that drives the lock bolt 141 to move upward. After the projecting portion 139 passes over the second engagement portion 137, the lock bolt 141 is reset (moves downward) to the state shown in FIG. 11 due to the elastic force of the elastic member 131, and the second engagement portion 137 is engaged with the projecting portion 139 again. As such, to lock the safety rope 110 by the lock 109, a user only needs to insert the locking pin 138 into the first through hole 136 without needing to pull the unlocking portion 134, such that the convenience of operation of the lock 109 is improved.

In some embodiments, the lamp 101 may be configured as a smart lamp, which further includes a lamp power module 128 and a control module. The lamp power module 128 includes a plurality of batteries arranged in the accommodating space 146, and the plurality of batteries surround a periphery of the light source 129. The batteries are electrically connected to the light source 129 to supply power to the light source 129. The control module includes a control board. The control board is arranged at a rear end of the lamp body 106. The control board is provided with an intelligent user interface 144. The intelligent user interface 144 includes at least one button 145 exposed out of the lamp body. Each of the at least one button 145 is configured to control the smart lamp to execute a function corresponding to the button 145. For example, the intelligent user interface 144 may include a button 145 configured to turn on or off the lamp 101, a button 145 configured to reduce the brightness of the lamp 101, a button 145 configured to increase the brightness of the lamp 101, a button 145 configured to change the color temperature of the light emitted from the lamp 101, etc. For the smart lamp, the lens 104 and the movable base 103 can move synchronously relative to the lamp body 106, the lens 104 and the movable base 103 can move synchronously along the optical axis 130 of the lens 104, and the lamp body 106 can hinder the rotation of the movable base 103 relative to the lamp body 106. The smart lamp also has a function of adjusting the beam angle.

Figure 12:
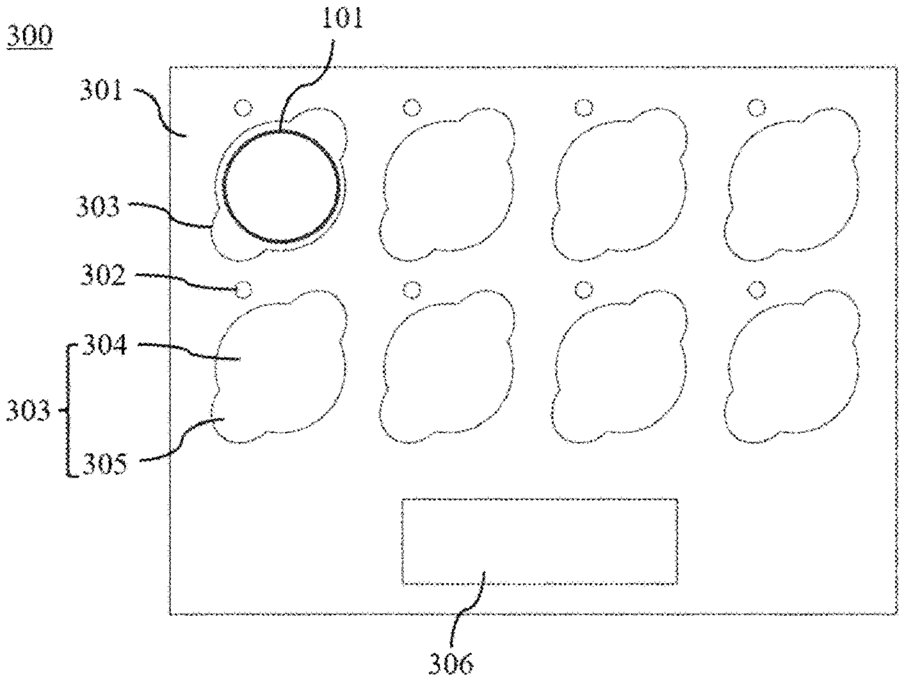
FIG. 12 is a front view of a lighting equipment according to an embodiment of the present disclosure.

As shown in FIG. 12, the present disclosure further provides a lighting equipment 300. The lighting equipment 300 includes a box 301, a box power module, and lamps 101 described above (where only one lamp 101 is shown in FIG. 8). As shown in FIG. 8, the box 301 includes a plurality of recesses 303, where each of the recesses 303 is configured to receive a respective one of the lamps 101. The box power module is not shown. The box power module is mounted in the box 301. When a lamp 101 is arranged in a recess 303, the lamp 101 is electrically connected to the box power module. The box power module may be an energy storage battery or a rechargeable battery. The box power module may be connected to the lamps 101 by connection lines, such that the box power module supplies power to all the lamps 101 placed in the lighting equipment 100. As such, there is no need to provide a battery in each lamp 101, providing a basis for simultaneously configuring parameters for all the lamps 101. The lighting equipment 300 integrates a plurality of lamps 101, to achieve a high lighting brightness. In addition, because the beam angle of the lamp 101 can be adjusted, the light output effect of the lighting equipment 300 can be flexibly adjusted. Moreover, the lamps 101 can be detached from the recesses 303, so that a user can adjust the number of lamps 101 mounted in the box 301 according to a required brightness of lighting or other requirements. The lighting equipment 300 further includes a control assembly 306. The control assembly 306 is mounted on the box 301. The control assembly 306 may be communicatively connected to the lamps 101 in the recesses 303. The control assembly 306 is configured to control an operational status of the lamps 101. The control assembly 306 may include a plurality of buttons and a display screen. The display screen is configured to display status information of the lighting equipment 300 or the lamps 101. A user may change the state of the lamp 101 by pressing the buttons, for example, change the color of light emitted by the lamp 101, turn on or off the lamp 101, and so on. In other words, the box 301 can accommodate a plurality of lamps 101 at the same time, and the control assembly 306 can simultaneously control the plurality of lamps 101 and simultaneously configure parameters for the plurality of lamps 101, including configuring addresses for the plurality of lamps 101. This solves the problem in the existing technology that a parameter of only one lamp can be set at a time in a large-scale activity, and reduces the time required for configuring parameters for the lamps, thereby improving the efficiency of lamp parameter configuration.

To electrically connect the lamp 101 to the box power module in the box 301, the lamp 101 may include first electrical connectors 108 exposed out of the lamp body 106 and electrically connected to the light source 129. The lighting equipment 300 may further include second electrical connectors (not shown) configured to be respectively plugged into the first electrical connectors 108. One second electrical connector is provided in each recess 303. The second electrical connectors are connected to the box power module by a cable 202. The second electrical connectors may be respectively connected to the first electrical connectors 108.

As shown in FIG. 12, the recess 303 includes a central region 304 and two peripheral regions 305 in communication with the central region 304, where the peripheral regions 305 protrude outward relative to an edge of the central region 304. The central region 304 is configured to accommodate the lamp 101, and the peripheral region 305 allows a user to put a finger into the recess 303 to remove the lamp 101. To prevent damage to the lamp 101, an elastic material such as rubber or foam may further be provided on a wall surface of the recess 303.

In some embodiments, the lighting equipment 300 further includes infrared emitters (not shown), where one or more infrared emitters may be provided in each recess 303. The lamp 101 includes an infrared receiver (not shown). The infrared receiver is exposed out of the lamp body 106. The infrared emitter may be arranged in the central region 304 of the recess 303, such that the detection accuracy of the detection unit will not be affected by a finger extending into the peripheral region 305. In addition, the rubber or foam on the wall surface of the recess 303 should not block the infrared emitter. The infrared emitter is configured to emit an infrared signal. Once the lamp 101 is properly placed into the recess 303, the infrared receiver can receive the infrared signal. After the infrared receiver receives the infrared signal, a second communication module of the lamp 101 starts to attempt to establish a wireless communication connection with a first wireless communication module of the lamp 101. The lighting equipment 300 further includes an indicator light 302 mounted on a surface of the box 301 and arranged close to the recess 303. After a lamp 101 in a recess 303 is communicatively connected to the control assembly 306, the indicator light 302 corresponding to the recess 303 is always on, prompting the user that the lamp 101 has been communicatively connected to the control assembly 306. A user may then control the operation of the lamp 101 through the control assembly 306. The first wireless communication module may include at least one of a Bluetooth module, a DMX module, a CRMX module, a UHF module, or a 2.4 G Wi-Fi module. The second wireless communication module may include at least one of a Bluetooth module, a DMX module, a CRMX module, a UHF module, or a 2.4G Wi-Fi module. A user may also control the lighting equipment 300 through a mobile phone, a tablet computer, or other electronic devices. For example, a user may first use a mobile phone to establish communication with the control assembly 306, and then send control instructions to the lighting equipment 300 through the mobile phone.

In the description of the present disclosure, the description with reference to the terms "an embodiment," "some embodiments," "exemplary embodiments," "example," "specific example," or "some example" and so on means that specific features, structures, materials or characteristics described in connection with the embodiment or example are embraced in at least one embodiment or example of the present disclosure. In this specification, exemplary descriptions of the foregoing terms do not necessarily refer to the same embodiment or example. Moreover, the described specific features, structures, materials, or characteristics may be combined in any suitable manner in one or more embodiments.

What is claimed is:

1. A lamp, comprising:

a lamp body, provided with an accommodating space;

a light source, arranged in the accommodating space;

a lens, wherein a light output surface of the light source faces the lens;

a movable base, movably connected to the lamp body, wherein the movable base is movable relative to the lamp body along an optical axis of the lens, the lamp body is configured to hinder a rotation of the movable base relative to the lamp body, and the lens is fixed to the movable base; and an adjustment ring, sleeved over the movable base, wherein the adjustment ring is rotatable about the optical axis relative to the movable base and is movable along the optical axis in synchronization with the movable base;

wherein at least one of the adjustment ring and the lamp body comprises a sliding block, another of the adjustment ring and the lamp body comprises a first sliding groove, two ends of the first sliding groove are spaced apart in a radial direction of the lens and are spaced apart in a circumferential direction of the lens, and the sliding block is slidably arranged in the first sliding groove; and when the adjustment ring is rotated relative to the movable base, the sliding block slides along the first sliding groove, and the adjustment ring moves in synchronization with the movable base to change a distance between the lens and the light source.

2. The lamp of claim 1, wherein the adjustment ring comprises the first sliding groove, the lamp body comprises the sliding block, the movable base comprises a second sliding groove, the second sliding groove is straight and extends in an axial direction of the lens, and the sliding block is slidably arranged in the second sliding groove.

3. The lamp of claim 2, wherein the movable base comprises a first shell and a second shell which are fixedly connected, the second shell comprises a body portion and a limiting portion, the body portion is annular, the body portion is provided with the second sliding groove, the adjustment ring is rotatably sleeved over the body portion, and the limiting portion is connected to one end of the body portion and protrudes relative to an outer peripheral surface of the body portion; and a part of the first shell protrudes relative to the outer peripheral surface of the body portion, and the first shell and the limiting portion clamp the adjustment ring in the axial direction of the lens.

4. The lamp of claim 1, wherein one of the movable base and the lamp body comprises a first engagement portion, another of the movable base and the lamp body comprises an engagement groove, and the first engagement portion is engaged in the engagement groove in response to the distance between the lens and the light source reaching a maximum value.

5. The lamp of claim 1, further comprising a light guide column fixed in the lamp body and located between the light output surface and the lens.

6. The lamp of claim 1, further comprising:

a light shield, detachably connected to the movable base and surrounding the lens;

a lock, mounted on the lamp body; and a safety rope, wherein one end of the safety rope is connected to the light shield, and another end of the safety rope is connected to the lock.

7. The lamp of claim 6, wherein the safety rope comprises a rope and a locking pin, the locking pin is connected to one end of the rope away from the light shield, the locking pin comprises an insertion portion and a projecting portion, two ends of the insertion portion are respectively connected to the projecting portion and the safety rope, and the projecting portion projects relative to an outer peripheral surface of the insertion portion; and the lock comprises:

a strike plate mounted on an outer surface of the lamp body, wherein the strike plate is provided with a first through hole and a second through hole, and the locking pin is passed through the first through hole;

a lock bolt comprising a second engagement portion and an unlocking portion, wherein a part of the unlocking portion extends out of the strike plate through the second through hole; and an elastic member, wherein one end of the elastic member is connected to the lock bolt, another end of the elastic member is connected to the lamp body, and an elastic force of the elastic member is used to maintain an engagement between the second engagement portion and the projecting portion.

8. A smart lamp, comprising:

a lamp body, provided with an accommodating space;

a light source, arranged in the accommodating space;

a plurality of batteries, arranged in the accommodating space and arranged around a periphery of the light source;

a movable base, movably connected to the lamp body, wherein the movable base is movable in a front-rear direction relative to the lamp body along an optical axis;

a lens, fixed to a front end of the movable base, wherein the lens is movable in synchronization with the movable base to change a distance between the lens and the light source; and a control module, comprising a control board arranged at a rear end of the lamp body, wherein the control board is provided with an intelligent user interface, the intelligent user interface comprises at least one button, wherein each of the at least one button is configured to control the smart lamp to execute a function corresponding to the button.

9. The smart lamp of claim 8, further comprising an adjustment ring sleeved over the movable base, wherein the adjustment ring is rotatable about the optical axis relative to the movable base and is movable along the optical axis in synchronization with the movable base; and wherein at least one of the adjustment ring and the lamp body comprises a sliding block, another of the adjustment ring and the lamp body comprises a first sliding groove, two ends of the first sliding groove are spaced apart in a radial direction of the lens and are spaced apart in a circumferential direction of the lens, and the sliding block is slidably arranged in the first sliding groove; and when the adjustment ring is rotated relative to the movable base, the sliding block slides along the first sliding groove, and the adjustment ring moves in synchronization with the movable base to change a distance between the lens and the light source.

10. The smart lamp of claim 9, wherein the adjustment ring comprises the first sliding groove, the lamp body comprises the sliding block, the movable base comprises a second sliding groove, the second sliding groove is straight and extends in an axial direction of the lens, and the sliding block is slidably arranged in the second sliding groove.

11. The smart lamp of claim 10, wherein the movable base comprises a first shell and a second shell which are fixedly connected, the second shell comprises a body portion and a limiting portion, the body portion is annular, the body portion is provided with the second sliding groove, the adjustment ring is rotatably sleeved over the body portion, and the limiting portion is connected to one end of the body portion and protrudes relative to an outer peripheral surface of the body portion; and a part of the first shell protrudes relative to the outer peripheral surface of the body portion, and the first shell and the limiting portion clamp the adjustment ring in the axial direction of the lens.

* * * * *